United States Patent Office 2,950,153
Patented Aug. 23, 1960

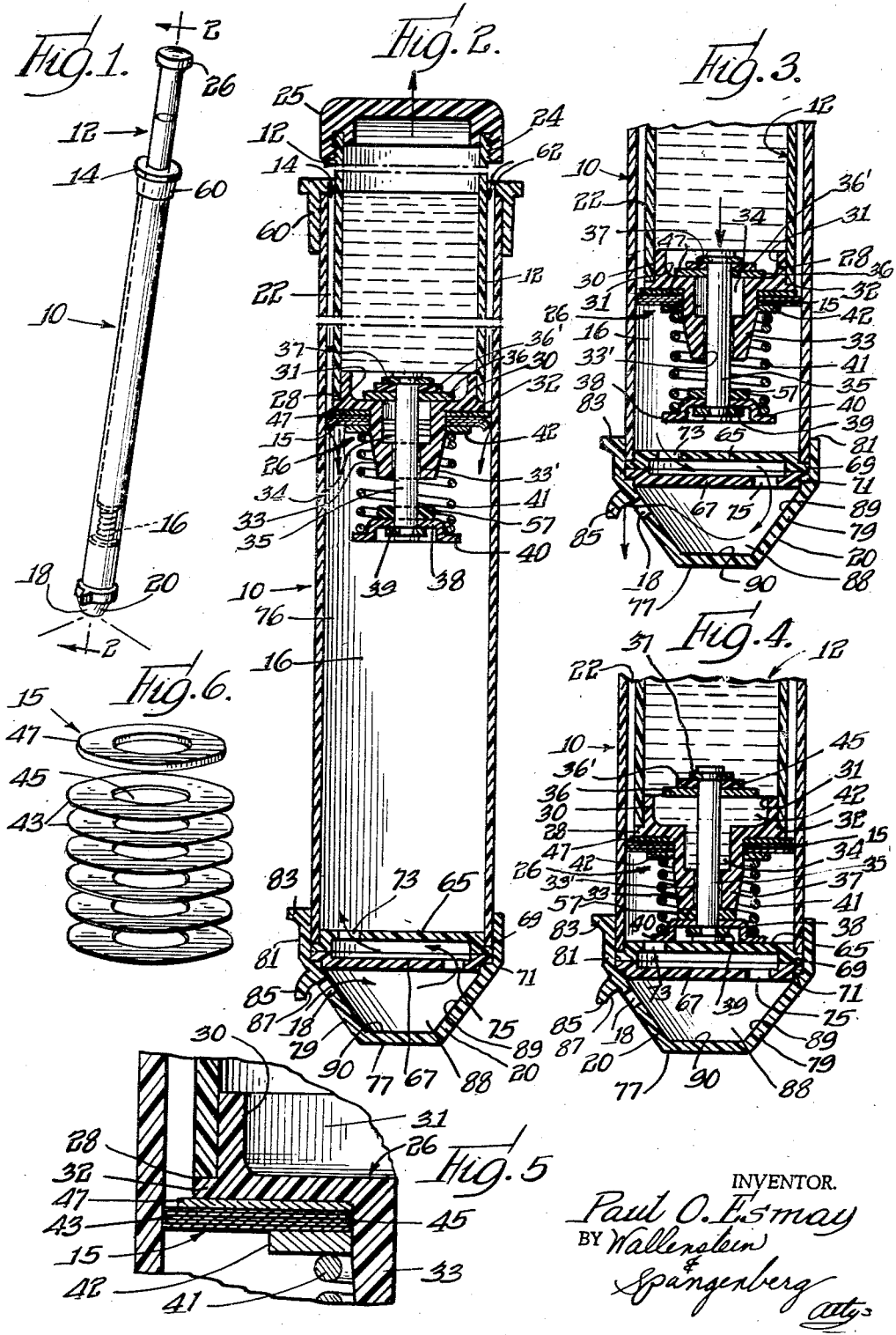
Aug. 23, 1960 — P. O. ESMAY — 2,950,153
HAND-OPERATED SPRAYER OR THE LIKE
Filed Jan. 12, 1959 — 2 Sheets-Sheet 1
INVENTOR.
Paul O. Esmay
BY Wallenstein & Spangenberg
Attys

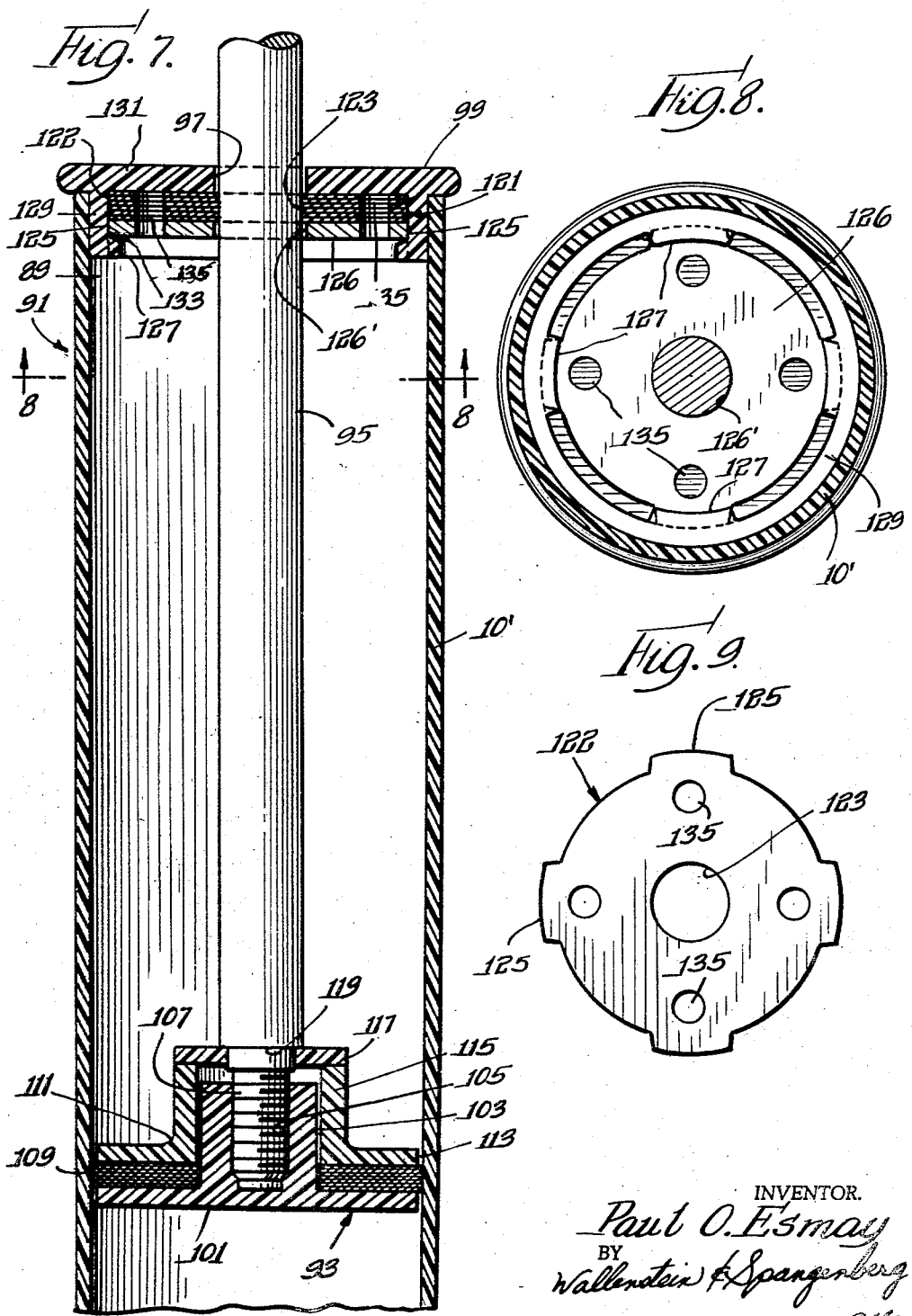

2,950,153

HAND-OPERATED SPRAYER OR THE LIKE

Paul O. Esmay, 1600 Main St., Three Rivers, Mich.

Filed Jan. 12, 1959, Ser. No. 786,064

10 Claims. (Cl. 309—23)

This application is a continuation-in-part of application Ser. No. 638,524, entitled Garden Spray Gun, filed February 6, 1957, now Patent No. 2,880,936.

This invention relates to hand-operated spray devices, such as sprayers for dispensing garden chemicals and the like, although some aspects of the invention have a broader application in reciprocating devices of both hand-operated and machine-driven types, such as pumps and other reciprocating devices where a piston, plunger, or their reciprocating member makes pressure sealing engagement with the walls of a cylinder or bore therein. More particularly, the invention relates to a reciprocating device, most preferably a hand-operated sprayer or similar device including a novel pressure sealing means between the relatively movable parts thereof where a sliding, pressure sealing engagement therebetween takes place, such as between a piston or plunger and the walls of the piston cylinder or plunger bore. The sealing means has particular utility in a hand-operated sprayer or similar pumping device where it forms a pressure seal in one direction of movement of the piston or plunger thereof and an open valve in the other direction of movement thereof where a fluid, such as air, passes around the sealing means.

Hand-operated spray devices are, in general, extremely tedious to operate due, in part, to the manner in which the pistons or plungers thereof make sliding engagement with the walls of the piston cylinder or plunger bore. Generally, in these hand-operated sprayers, a compromise must be made between the requirements of a good pressure seal on the one hand, and minimum frictional drag on the other hand. The requirement of a good seal is generally a paramount requirement, with the result that such sprayers are usually relatively difficult to operate.

It is, accordingly, an object of the present invention to provide a reciprocating device, particularly, although not necessarily, a hand-operated sprayer or the like wherein, in at least one direction of movement thereof, a rugged, highly effective pressure seal is maintained between relatively reciprocating parts thereof, such as between a piston or plunger and the walls of the cylinder or bore in which the piston or plunger is reciprocated and, at the same time, the resultant frictional drag is so small that the piston or plunger or other reciprocating part could be easily manually operated or otherwise driven with a relatively small amount of force.

It is another object of the present invention to provide a reciprocating device, most particularly a hand-operated device, which includes a sealing unit carried thereby which, in one direction of movement of a piston or plunger thereof, makes a highly effective seal while requiring a minimum of force to move the same, and, in the other direction of movement thereof, provides a one-way valve which readily flexes to allow passage therearound of air, water or other fluid.

In accordance with one aspect of the present invention, one of the relatively reciprocating members of the reciprocating device has a sealing unit in the form of a stack of flat, wafer-like discs or the like made of a flexible slippery material, which is most advantageously polyethylene film or similar material. The stack of discs are arranged so that the longitudinal axis thereof is parallel to the direction of movement of the reciprocating member. The discs slidingly engage the other of said relatively reciprocating members and are provided with at least one rigid backing extending close to but still spaced from said other member. The latter spacing is such that the flexure of the stack of discs as a whole into the space between the backing and said other part is prevented. If a seal is to be effected in both directions of movement of the reciprocating member, a rigid backing as described is placed at both ends of the stack of discs. In this application of the invention, the stack of discs may form a packing gland between a plunger or piston rod and the defining walls of an opening in the body of the device into which the rod extends, or a two-way sealing ring carried by a pump piston.

The flexibility of the discs resulting from the thinness and the material out of which they are made enables a substantially closer fit between the discs and the walls of the part with which it makes sliding engagement than would be possible with a sealing unit made from a single piece of material having a thickness equivalent to the stack of discs, so that substantially greater sealing action is obtained for a sealing unit of a given thickness. Moreover, since the discs are arranged in random fashion in the stack, any defect which may be present in one angular position of a disc will not necessarily result in a break-down of the seal provided by the stack of discs as a whole, since it is highly unlikely that the other discs would be defective, if at all, at the same angular point. Also, both the flexibility of the discs and the slippery nature of the polyethylene or similar type material greatly reduce frictional drag. Since the above-mentioned characteristics of the stack of discs provide for increased sealing capabilities over a sealing unit made from one or a few pieces of much thicker and different materal, much less area of contact is required between the sealing discs and the walls with which they make sliding engagement for a pressure seal of a given quality, further minimizing the frictional drag.

In accordance with another aspect of the invention, the stack of discs above described is carried by the piston or plunger of a sprayer or similar pumping device and is provided with a rigid backing as above described on only one side. The flexibility of the discs enables them to act as an open valve when moved a direction away from the unbacked side of the stack of discs. The backing, of course, must be spaced from the walls of the piston cylinder or plunger bore a sufficient amount to enable a sufficient quantity of the fluid involved to pass around the sealing unit, or otherwise provided with suitable peripheral pass-through slots for the fluid.

Other objects, advantages and features of the invention will become apparent upon making reference to the specifications to follow, the claims and the drawings wherein:

Fig. 1 is a perspective view of a hand-operated garden sprayer which incorporates features of the present invention;

Fig. 2 is an enlarged longitudinal sectional view of the sprayer of Fig. 1, taken along section line 2—2 therein, and showing the plunger tube being moved upward within the outer tube, the arrows therein showing the path of movement of air and material to be sprayed into the pumping space thereof;

Fig. 3 is a fragmentary longitudinal sectional view corresponding to Fig. 2, showing the position of the plunger tube and the path of fluid flow during the compression stroke of the plunger tube;

Fig. 4 is a view corresponding to the view of Fig. 3 showing the bottom of the plunger tube in contact with the bottom of the outer tube and the consequent opening of the dispensing valve at the bottom of the plunger tube when the receiving wall is filled with a finite quantity of fluid;

Fig. 5 is a fragmentary enlarged view of the bottom end of the plunger tube showing the valve and sealing discs of the present invention attached to the end thereof;

Fig. 6 is an exploded view of the valve and sealing disc assembly of the present invention;

Fig. 7 is an enlarged longitudinal fragmentary sectional view of a reciprocating device utilizing the sealing unit of the present invention on a plunger, and also as a packing gland around a plunger rod;

Fig. 8 is a transverse sectional view, partly broken away, through the reciprocating device shown in Fig. 7, taken along section line 8—8 in Fig. 7; and Fig. 9 is a plan view of one of the sealing discs making up the sealing unit of Fig. 7.

Figs. 1–6 illustrate a sprayer for garden chemicals comprising an outer elongated, cylindrical tube 10 made preferably of a transparent plastic material, such as Tenite Butyrate, a mixed ester composition made by Eastman Chemical Products, Inc., and an inner elongated cylindrical plunger tube 12 carrying the supply of material to be sprayed and made of the same transparent material and having a length of the same order of magnitude as the outer tube. The plunger tube 12 is reciprocally mounted within the outer tube 10 forming a guide bore therefore, the plunger tube extending from an open upper end 14 thereof so that the plunger tube may be easily grasped and reciprocated for substantially the full length of the outer tube. During the upward stroke of the plunger tube (Fig. 2), air is drawn around a novel open valve and sealing means 15 constituting an important part of the present invention, and into a pumping space 16 beneath the plunger tube, and the material to be dispensed is deposited in the pumping space; and, during the down stroke of the plunger tube, the valve and sealing means 15 closes and makes a highly effective pressure sealing engagement with the walls of the outer tube 10, so that the plunger tube forces the material to be sprayed in atomized form through a discharge orifice 18 formed in a dome-shaped end cap 20 connected to the bottom end of the outer tube 10. Now that the overall make-up and operation of the spray device has been briefly explained, the detailed construction of the various components making up the sprayer will be described.

Referring now more particularly to Figs. 2–6, the plunger tube 12 has an outer diameter somewhat smaller than the inner diameter of the outer tube 10 so that the former fits loosely within the latter to provide an annular air-intake passage 22 therebetween. The very top of the plunger tube is externally threaded as at 24 to threadedly receive a closure cap 25, and the bottom of the plunger tube is closed by an end cap and valve assembly 26. The end cap assembly comprises an end cap member 28 which is preferably made of the same material as tube 12 and has a cylindrical skirt portion 30 defining a valve seat recess 31, the skirt portion fitting within the plunger tube and preferably cemented to the inner walls thereof. The end cap member has a flanged portion 32 which underlies the end of the plunger tube.

The end cap member 28 has a central depending boss 33 which has a central cylindrical well 34 formed therein which opens onto the center portion of the larger valve-seat recess 31. The boss 33 also has a central bore 33′ which extends from the bottom surface of the boss to the bottom of the well 34.

Extending freely through the boss bore 33′ and the well 34 and terminating within the valve seat recess 31 is a valve stem 35 made of metal or other suitable material. The valve stem 35 has a rubber valve head 36 snugly applied thereover and held upon the stem by a preferably plastic washer 36′ which in turn is held upon the stem by a metal snap ring 37 extending within an annular groove formed around the valve stem 35. At the bottom end of the valve stem there is provided an inverted, flanged metal cup-shaped member 38 which snugly surrounds the valve stem and is held thereupon by a metal snap ring 39 fitting within an annular groove formed in the valve stem. The member 38 has a peripheral flange 40 thereon forming a shoulder for receiving the bottom end of a metal coil compression spring 41 whose upper end bears against a preferably plastic washer 42 which contacts the valve and sealing means 15 to hold the same in place upon the plunger tube. The spring 41 urges the valve stem 35 downward and hence the valve head 36 upon the bottom of the valve seat recess 31, closing off the opening between the well 34 and the compartment within the plunger tube 12 containing the material to be sprayed.

In accordance with the present invention, the valve and sealing means 15 comprises a stack of very thin, circular, flat wafer-like discs 43 or the like, each made of a flexible, somewhat slippery material, which is most advantageously polyethylene or similar synthetic plastic material. Thicknesses of the order of from .004 to .007 inch have been found to be especially satisfactory. Sheets of material of such thinness are often referred to as film or having the thinness of film. The discs are each provided with a relatively large central recess 45, the defining walls of which fit snugly around the upper end of the boss 33. The discs are larger than the inside diameter of the tube so that a pressure sealing fit results. Due to the flexibility of the sealing disc material, this oversize, for example, can be as much as .0125 to .019 inch on a side.

Sandwiched between the stack of discs and the end cap member 28 is a rigid backing disc 47 of plastic or metal which extends in closely spaced relation to the walls of the tube 10, this spacing being sufficiently large to provide sufficient clearance for passage of a requisite amount of air for good pumping action but sufficiently small that the periphery of the stack of valve discs 43 will not be so flexible that they readily bend into the space. It should be noted that flexibility of the stack of discs considered as a whole is substantially less than the discs individually since each is backed up by the adjacent disc and the rigid backing disc 47.

The valve discs make pressure sealing sliding engagement with the walls of the tube 10 when the plunger tube is pushed down (Fig. 3) and with only a small amount of drag and readily flex downwardly (Fig. 2) to open the valve and allow air to pass therearound.

The following are examples of valve discs which give excellent sealing qualities with only slight frictional drag where the inside diameter of the outer tube 10 has a tolerance of from 1.406 inches to 1.411 inches and the discs have an oversize of from .0125 inch to .019 inch on a side and the backing disc 47 is spaced approximately from .020 to .030 inch, preferably .023 inch on a side from the inner walls of outer tube 10:

(1) a stack of three discs each of a thickness of .007 inch, (2) a stack of four discs each of a thickness of .006 inch, (3) a stack of from four to six discs each of a thickness of .005 inch (the most preferred arrangement is a stack of six discs), and (4) a stack of seven or eight discs each of a thickness of .004 inch.

Secured upon the inverted cup-shaped member 38 is a rubber washer 57 which engages the bottom of the end cap boss 33 when the valve stem is pushed upwardly to prevent leakage of the material through the end cap well 34 and the clearance space between the defining walls of bore 33′ and the valve stem 35 into pumping space 16, should the operator lean against the plunger tube. (The latter clearance space normally enables the slow leakage of material from the well 34 into the pumping space during the upward movement of the plunger tube.)

Referring now to the construction of the outer tube 10, this tube is provided at its top with an annular sleeve member 60 made of preferably the same material as the tube 10 itself, which sleeve is cemented to the latter tube. The sleeve 60 has an inwardly extending portion 62 which overlaps and extends a small distance beyond the inner surface of the tube 10 to extend contiguous to the plunger tube, but with a small air passage space provided therebetween, to provide support for the plunger tube.

The bottom end of the outer tube is provided with a pair of axially-spaced, baffle-forming transverse walls 65—67. These walls have confronting peripheral flanges 69—71 which are cemented together and to the bottom edge of the outer tube. These walls may be made of a material similar to that out of which the outer tube is made. The innermost or uppermost wall 65 has a circumferential opening or slot 73 adjacent its perimeter and the lowermost or outermost wall 69 has a similar circumferential slot or opening 75 located contiguous to its perimeter at a point diametrically opposite the slot 73. In this manner, a tortuous path for the flow of air and material to be sprayed is provided between the pumping space 16 and the slot 75 of the outermost wall 67.

Covering the baffle-forming walls is the above mentioned dome-shaped end cap 20 of the outer tube which may be made of the same material as tube 10. This end cap has a flat bottom or end portion 77 of a much smaller size than the diameter of the outer tube and a frusto-conical wall portion 79 extending upwardly and outwardly from the flat bottom 77 annd terminating in a generally cylindrical skirt portion 81 having a radially projecting portion 83 at one point thereon. The frusto-conical wall 79 contains the aforementioned discharge orifice 18 which is located at the same circumferential position as the radial projection 83 of the end cap and the center line of the circumferential slot 73 of the uppermost or innermost baffle-forming wall 65. The radial projection 83 indicates to the operator the location of the discharge orifice 18 so that he may properly position the spray gun to discharge the spray in the proper direction.

In order to fan out the fluid stream discharging from the orifice 18, a deflector lip 85 is preferably formed integrally with the body of end cap 20 above the discharge orifice. The deflector lip 85 has a concave inner surface 87 against which the emerging stream of fluid impinges and deflects laterally outwardly.

The dome-shaped end cap member 20 defines an unobstructed space 88 therein of generally the same shape as the end cap member itself. The inner surfaces 89—90 thereof define the extremities of the space 88 and aid in guiding the mixture of air and liquid from the opening 75 in the wall 67 to the discharge orifice 18.

The baffle wall design just described is particularly useful in the spraying of liquid materials since the space defined between the walls 65 and 67 aids greatly in mixing the liquid and air.

The operation of the sprayer of the invention is as follows: When the plunger tube 12 is telescoped within the outer tube near but not quite to its fullest extent, the cup-shaped member 38 at the bottom of the plunger tube makes contact with the uppermost baffle wall to place the spring 41 under compression. The plunger tube then moves downward a small amount until the bottom of the boss 33 of the end cap member 28 touches the top of the rubber gasket 57 to seal off the clearance space between the valve stem 35 and the bore 33′. In this position of the plunger tube, the valve head 36 is spaced from the top of the well 34 so that the material to be sprayed within the plunger tube quickly fills the well 34. As the plunger tube is pulled upwardly within the outer tube, the spring 41 expands and presses the cup-shaped member 38 downward to bring the valve head 36 tightly around the well 34 thereby sealing off the well from the supply compartment within the plunger tube. The material then in the well 34 slowly leaks through the clearance between the defining walls of the bore 33′ and valve stem 35 into the pumping space 16 beneath the plunger tube. Withdrawing the plunger tube from the outer tube reduces the pressure in the pumping space 16 substantially below atmospheric pressure so that air is drawn into the pumping space through the clearance between the plunger tube and the sleeve 30 in the main body of the outer tube. The differential pressure existing between pumping space 16 and the annular clearance space 22 above the valve disc assembly 28 is sufficient to deform or force the peripheral portions of the disc assembly downwardly, as shown in Fig. 2, to enable passage of air into the pumping space 16. A much smaller quantity of air enters the pumping space 16 through the discharge orifice 18 in the bottom of the outer tube 10, but this air moving quickly aids in unclogging the passages leading to the pumping space and in creating a turbulence which aids in mixing the material to be sprayed and the air. Thus, the gradual dropping of the material in the well 34 into the pumping space 16 together with the sucking of air into the pumping space greatly aids in admixing the material to be sprayed and the air. Additionally, the degree of upward movement imparted to the plunger tube is a function of the concentration of the spray desired. The greater the upward movement, the greater the amount of air sucked into the pumping space 16 and therefore the less concentrated is the atomized spray issuing from the discharge orifice upon the downward stroke of the plunger tube.

Upon downward movement of the plunger tube, pressure builds up in the pumping space 16 which forces the peripheral portions of the valve disc assembly 15 tightly against the inner walls of the outer tube to form an airtight seal therewith. The spring 41 is preferably selected so that it will give a little (i.e. not enough to result in any leakage of material from the plunger tube) under this pressure so that air under pressure will leak under the valve head 36 and into the plunger tube raising the pressure therein. The compression stroke, of course, also forces the mixture of air and the material to be sprayed through the path indicated by the arrows. This path extends through the opening or openings in the baffle walls and then along the sides of the space 88 formed within the dome-shaped end cap 20 following a generally tortuous path to the discharge orifice 18. The tortuous path creates a turbulence which greatly increases the intermixture of the air and the material to be sprayed and hence the degree of atomization of the latter material. As the mixture passes through the discharge orifice, it strikes the deflector lip 85 and fans outwardly, as shown most clearly in Fig. 1.

As previously indicated, the sealing unit of the present invention is applicable not only as a one-way valve, but also as a sealing unit which seals in both directions of movement of the piston or plunger involved and also as a stationary packing gland for making sealing engagement with a reciprocating member, such as a piston or plunger rod. These applications of the invention are illustrated in Figs. 7–9 which show a reciprocating device 91 having an outer tubular member 10′ defining a plunger bore in which is reciprocally mounted a plunger 93 operated by a rod 95 extending through an opening 97 in the center of a cap 99 suitably fixed over the open top of the outer tube 10′.

The plunger 93 has a circular disc-shaped bottom portion 101 having an upstanding cylindrical neck 103 provided with an upwardly facing bore 105 which threadedly or otherwise receives the reduced bottom end 107 of the operating rod 95.

Seated on the annular top surface of the bottom portion 101 of the plunger and closely surrounding the neck 103 thereof is a stack of polyethylene or similar discs 109 having the same characteristics as the valve disc assembly previously described in connection with the embodiment of Figs. 1–6. The perimeter of the plunger portion 101 is spaced from the inner walls of the outer tube 10′, for example, in the neighborhood of from .020 to .030 inch, preferably from .022 to .024 inch. A disc retainer cap 111 is provided on top of the disc assembly 109, the retainer cap 111 comprising a flat bottom portion 113 of the same diameter as the bottom portion 101 of the plunger, and a hollow upstanding neck portion 115 fitting around the top of the neck portion 103 of the plunger. The retainer cap is held in place by a snap ring 117 sandwiched between the upper end of the neck portion 115 of the retainer cap and a downwardly facing shoulder 119 provided by the reduced end 107 of the plunger rod 95.

The disc assembly is thus backed up on both sides so that the assembly seals in both directions of movement of the plunger. The frictional drag offered by the disc assembly is such that the operating rod may be operated by hand where the back pressures are of a similar order to that offered by the sprayer device shown in Figs. 1–6.

The cap 99 at the top of the outer tube 10′ carries a packing gland generally indicated by reference numeral 121 which comprises a stack of flat, wafer-like sealing discs 122 of polyethylene or similar material. These discs provide a pressure seal between the defining walls of center holes 123 and the operating rod 95. The diameter of the latter holes may be undersized with respect to the operating rod, for example, in the neighborhood of from .007 to .015 inch, assuming 6 discs each of .006 inch thick. The dimensions, however, are not critical.

Each of the sealing discs has a series of spaced projecting portions 125, the perimeter of which falls along the same circle. A rigid backing disc 126 having a central opening 126′ and of similar shape to each of the sealing discs 122 is placed on the bottom of the stack of sealing discs and the backing disc and the sealing discs are wedged in a space between a series of projections or lugs 127 extending inwardly from a depending skirt 129 of the cap 99 and the top wall 131 thereof. Each projection 127 has an axially sloping upper surface 133, the uppermost portion of which is spaced from the bottom of the top wall 131 an amount somewhat less than the thickness of the stack of sealing discs 122 and the backing disc 126, so that the discs can be wedged or cammed securely in place between cap wall 131 and the cap projections 127. The operating rod 95 passes through the central opening 97 in the cap top wall, and the defining walls of the latter opening are spaced the same distance from the operating rod as the defining walls of the central opening 126′ of the backing disc 126.

The inner diameter of the skirt 129 from which the projections 127 extend fall along a circle slightly larger than the circle along which the projecting portions 125 of the stack of sealing discs 126 fall, so that the latter may be wedged in place by passing the projecting portions of the stack of discs through the space between the projections 127 and then turning the same so that they pass behind the projections 127. Holes 135 are provided in each disc 122 and the backing disc 126 to receive a 4-pronged tool (not shown) by means of which the stack of discs can be rotated and forced into place behind the projections 127.

The backing disc 126 prevents the downward flexure of the sealing discs. To this end, the defining walls of the central opening 126′ of the backing disc are spaced from the operating rod, for example, in the neighborhood of from .010 to .015 inch or less.

In each of the applications of the present invention described above, the disc assembly provides a slippery, low frictional drag surface which makes a highly effective pressure seal between two relatively movable reciprocating members. In one application of the invention, the disc assembly provides a seal in both directions of movement of the reciprocating member and, in another application of the invention, acts as a one-way valve in one direction of movement of the reciprocating member and as a pressure seal in the other direction of movement thereof.

It should be understood that numerous modifications may be made of the preferred forms of the invention above described without deviating from the broader aspects of the invention.

What I claim as new and desire to protect by Letters Patent of the United States is:

1. In a hand-operated spray gun of the type having an outer member in which a plunger is mounted for manual reciprocation in a plunger bore toward and away from a pumping space to which the material to be sprayed is fed, there being an annular air passage space between said plunger and the defining walls of said plunger bore into which air is drawn by suction during the rearward stroke of said plunger, the improvement in a one-way valve carried by said plunger which valve seals off said annular passage space from said pumping space during the forward or compression stroke of said plunger and provides an opening between said annular air passage space and said pumping space during the rearward stroke thereof for directing appreciable quantities of air to said pumping space comprising: a stack of wafer-like valve-forming discs each having the thinness of film and made of a flexible wear-resistant, slippery material secured to said plunger and being of a size slightly greater than said plunger bore and the peripheral portions thereof being forwardly flexible, the peripheral edges of said stack of discs making free sliding, air sealing engagement with the walls of said plunger bore during the forward or compression stroke of said plunger and being flexed forwardly during the rearward stroke of the plunger due to the reduced pressure then existing in said pumping space, whereby air is sucked into said pumping space.

2. In a hand-operated spray gun of the type having an outer member in which a plunger is mounted for manual reciprocation in a plunger bore toward and away from a pumping space to which the material to be sprayed is fed, there being an annular air passage space between said plunger and the defining walls of said plunger bore into which air is drawn by suction during the rearward stroke of said plunger, the improvement in a one-way valve carried by said plunger which valve seals off said annular passage space from said pumping space during the forward or compression stroke of said plunger and provides an opening between said annular air passage space and said pumping space during the rearward stroke thereof for directing appreciable quantities of air to said pumping space comprising: a stack of wafer-like valve-forming discs each having the thinness of film and made of polyethylene material secured to said plunger nearest said pumping space and being of a size slightly greater than said plunger bore and the peripheral portions thereof being forwardly flexible, the peripheral edges of said stack of discs making free sliding, air sealing engagement with the walls of said plunger bore during the forward or compression stroke of said plunger and being flexed forwardly during the rearward stroke of the plunger due to the reduced pressure then existing in said pumping space, whereby air is sucked into said pumping space.

3. In a hand-operated spray gun of the type having an outer member in which a plunger is mounted for manual reciprocation in a plunger bore toward and away from a pumping space to which the material to be sprayed is fed, there being an annular air passage space between said plunger and the defining walls of said plunger bore into which air is drawn by suction during the rearward stroke of said plunger, the improvement in a one-way valve carried by said plunger which valve seals off said annular passage space from said pumping space during the forward or compression stroke of said plunger and provides an opening between said annular air passage space and said pumping space during the rearward stroke thereof for directing appreciable quantities of air to said pumping space comprising: a stack of wafer-like valve-forming discs each having the thinness of film and made of flexible wear-resistant, slippery material secured to the end of said plunger nearest said pumping space and being of a size somewhat greater than said plunger bore to provide a sealing, sliding fit therewith, means on the end of said plunger providing a forwardly facing shoulder against which the central portion of said stack bears, means forcing the central portion of said stack of discs against said shoulder, the peripheral portions of said discs being forwardly flexible, the peripheral edges of said stack of discs making free sliding, air sealing engagement with the walls of said plunger bore during the forward or compression stroke of said plunger and being flexed forwardly during the rearward stroke of the plunger due to the reduced pressure then existing in said pumping space, whereby air is sucked into said pumping space.

4. A hand-operated pumping device comprising: an outer member in which a plunger is mounted for manual reciprocation in a plunger bore toward and away from a pumping space, there being an annular passage space between said plunger and the defining walls of said plunger bore through which a fluid to be pumped is drawn by suction during the rearward stroke of said plunger, a one-way valve carried by said plunger which valve seals off said annular passage space from said pumping space during the forward or compression stroke of said plunger and provides an opening between said annular air passage space and said pumping space during the rearward stroke thereof for directing appreciable quantities of the fluid to be pumped into said pumping space, said one-way valve comprising: a stack of very thin, flat, wafer-like valve-forming members carried by the plunger and each having the thinness of film and made of a flexible slippery material and being of a size greater than said plunger bore to provide pressure sealing, sliding engagement with the defining walls thereof, means on said plunger forming a forwardly facing backing shoulder against which said valve-forming members bear, the perimeter of said backing shoulder contiguous to but spaced from the defining walls of the plunger bore to provide a support backing for the peripheral portions of the stack of valve-forming members and which prevents substantial rearward flexing thereof as a whole during the forward stroke of the plunger, so as to provide a pressure seal between the plunger and said plunger bore walls, and the peripheral portions of said valve-forming members being free to flex forwardly during the rearward stroke of the plunger due to the reduced pressure then existing in said pumping space, whereby said fluid is sucked into said pumping space.

5. In an apparatus having a reciprocating member movable with respect to a guiding wall surface, sealing means carried by one of said reciprocating members and guiding wall surface and making free sliding, pressure sealing engagement with the other of same and comprising: a stack of flat wafer-like members having the thinness of film, the longitudinal axis of which is parallel to the direction of movement of said reciprocating member, each of said wafer-like members being made of a flexible slippery material, and rigid backing means on at least one end of said stack for preventing appreciable axial flexure of the said wafer-like members in at least one axial direction.

6. In an apparatus having a reciprocating member movable with respect to a guiding wall surface, sealing means carried by one of said reciprocating members and guiding wall surface and making free sliding, pressure sealing engagement with the other of same and comprising: a stack of flat wafer-like, polyethylene members having the thinness of film, the longitudinal axis of which is parallel to the direction of movement of said reciprocating member, and rigid backing means on at least one end of said stack for preventing appreciable axial flexure of the said wafer-like members in at least one axial direction.

7. In an apparatus having a reciprocating member movable with respect to a guiding wall surface, sealing means carried by one of said reciprocating members and guiding wall surface and making free sliding, pressure sealing engagement with the other of same and comprising: a stack of flat wafer-like members having the thinness of film, the longitudinal axis of which is parallel to the direction of movement of said reciprocating member, each of said wafer-like members being made of a flexible slippery material, and rigid backing means on only one end of said stack for preventing appreciable axial flexure of the said wafer-like members in only one axial direction, said stack of wafer-like members being free to flex axially in the other direction so as to form a one-way valve.

8. In an apparatus having a reciprocating member movable with respect to a guiding wall surface, sealing means carried by one of said reciprocating members and guiding wall surface and making free sliding, pressure sealing engagement with the other of same and comprising: a stack of flat wafer-like members having the thinness of film, the longitudinal axis of which is parallel to the direction of movement of said reciprocating member, each of said wafer-like members being made of a flexible slippery material, and rigid backing means on both ends of said stack for preventing appreciable axial flexure of the said wafer-like members in both axial directions.

9. In an apparatus having a reciprocating member passing through an opening in a casing member, a packing gland carried by said casing and surrounding said reciprocating member at the point of entry into said casing member and making free sliding, pressure sealing engagement with the periphery of said reciprocating member, said packing gland comprising: a stack of wafer-like members having the thinness of film, the longitudinal axis of which is parallel to the direction of movement of said reciprocating member, each of same wafer-like members being made of a flexible material, and rigid backing means on both ends of said stack for preventing appreciable axial flexure of said wafer-like members in both axial directions.

10. An outer member having a plunger bore therein, a plunger mounted for reciprocation in said bore, sealing means carried by said plunger which seals off the space between the plunger and the defining walls of said plunger bore during at least one direction of movement of said plunger, said sealing means comprising: a stack of wafer-like members having the thinness of film and each made of flexible material and being of a size somewhat greater than said plunger bore to provide pressure sealing sliding engagement with the defining walls of said plunger bore, means on said plunger forming a backing shoulder for at least one end of said stack of wafer-like members, and the perimeter of said backing shoulder being closely spaced from the defining walls of the plunger bore, to provide a support backing for the peripheral portions of said wafer-like members which prevents substantial flexing of the stack as a whole during the movement of said plunger in one direction.

References Cited in the file of this patent

UNITED STATES PATENTS 2,399,550     Klien  ------------------ Aug. 30, 1946

FOREIGN PATENTS 920,943     France  ------------------ Jan. 8, 1947